(12) United States Patent
Finkelstein

(10) Patent No.: US 7,149,020 B2
(45) Date of Patent: Dec. 12, 2006

(54) MIRROR AND COIL LASER BEAM PROJECTION APPARATUS

(75) Inventor: David Finkelstein, Coral Springs, FL (US)

(73) Assignee: LaserRave LLC, Coral Springs, FL (US)

( * ) Notice: Subject to any disclaimer, the term of this patent is extended or adjusted under 35 U.S.C. 154(b) by 103 days.

(21) Appl. No.: 10/680,266

(22) Filed: Oct. 7, 2003

(65) Prior Publication Data
US 2004/0081210 A1 Apr. 29, 2004

Related U.S. Application Data

(60) Provisional application No. 60/416,655, filed on Oct. 7, 2002.

(51) Int. Cl.
*G02B 26/08* (2006.01)
(52) U.S. Cl. .................................... 359/212
(58) Field of Classification Search ............. None
See application file for complete search history.

(56) References Cited

U.S. PATENT DOCUMENTS 4,010,361 A * 3/1977 Latterman et al. .......... 362/324
4,887,197 A * 12/1989 Effinger ....................... 362/306

* cited by examiner

*Primary Examiner*—Euncha P. Cherry
(74) *Attorney, Agent, or Firm*—J. Harold Nissen; Lackenbach Siegel, LLP

(57) ABSTRACT

A display system, apparatus and method for generating a visible pattern onto a display surface responsive to an audio frequency input signal by emitting a visible beam of light along a predetermined beam axis, interposing a reflector along the beam axis for reflecting the light beam to form a reflected beam directed generally towards the display surface, a pair of movable coils and a magnetizable element associated with each coil responsive to audio frequency input signals for movement of the reflector to generate a pattern on the display surface, supporting the reflector proximate to the pair of coils for movement of the reflector relative to the magnetizable elements, the predetermined beam axis having an angle of variation of the visible beam of light which is greater than zero degrees and less than ninety-degrees, and the visible beam of light is preferably a laser beam.

19 Claims, 4 Drawing Sheets

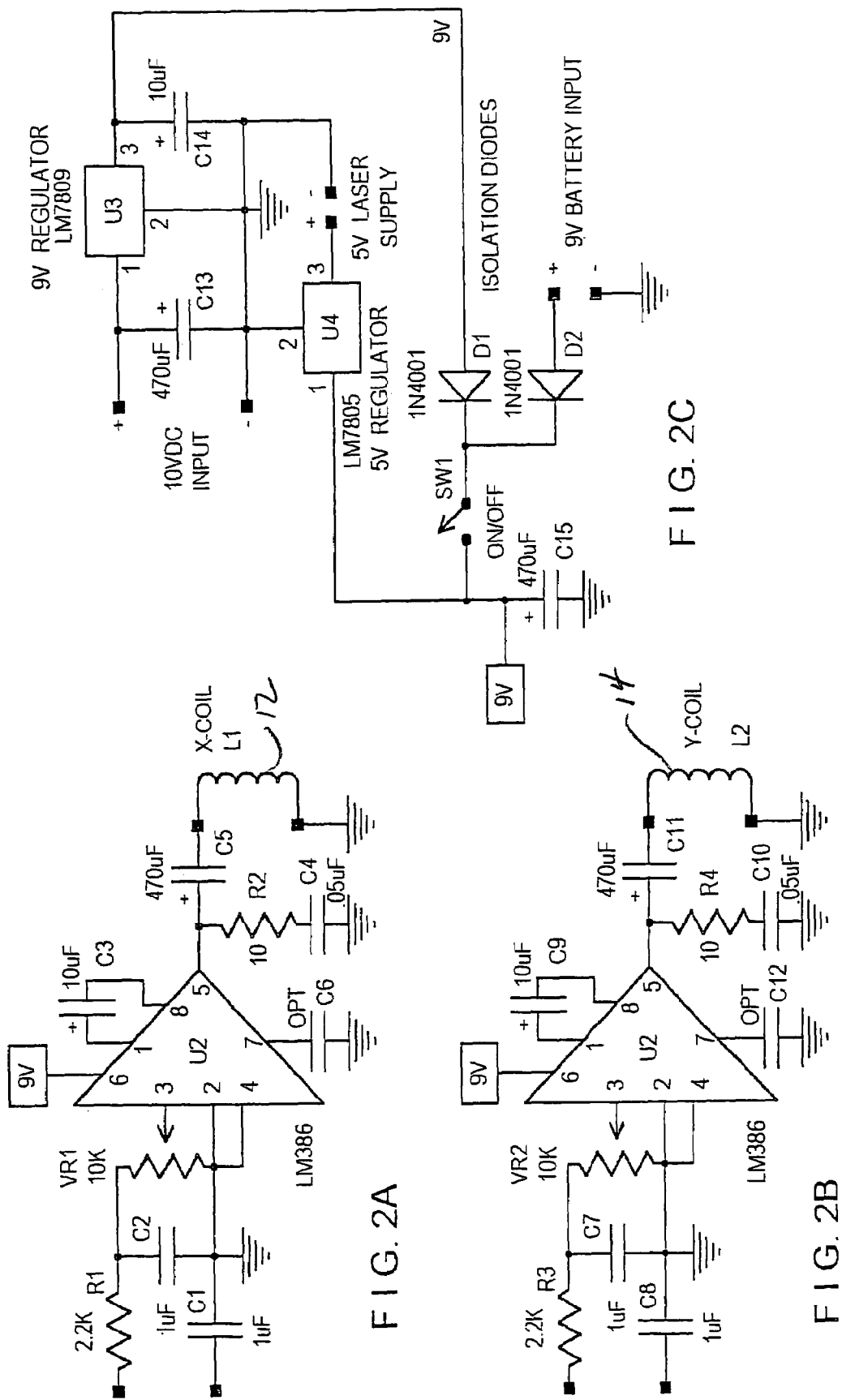

MIRROR AND COIL LASER BEAM PROJECTION APPARATUS

CROSS REFERENCE TO RELATED APPLICATION

This Application claims priority from Provisional Patent Application Ser. No. 60/416,655 filed Oct. 7, 2002.

BACKGROUND OF THE INVENTION

1. Field of the Invention

The present invention relates generally to a laser beam projection apparatus and more specifically it relates to a laser projection apparatus wherein the laser beam is deflected by movement of a mirror or series of mirrors that are moved by way of a magnetic field generated by a coil or series of coils.

2. Description of Related Art

The use of a laser beam and a mirror to provide a projection onto a surface is known. Attempts have been made with laser audio-visual equipment to generate light patterns responsive to audio frequency input signals to reflect a laser beam off the front surface of a mirror. Additionally, image projection systems employing laser projections are also known. The projection of various laser patterns, such as Lissajou patterns are also well known.

It can be appreciated that laser beam projection apparatus have been in existence for years. Current apparatus have certain limitations, such as:

1) they are driven by very expensive electro-magnetic apparatus known as galvanometers.
2) they are driven by inexpensive rotary motors.

The problems with these two (2) existing methods for laser beam projection is that in the first case, this apparatus as outlined in U.S. Pat. No. 5,117,221 to Mishica, Jr., is very expensive and therefore not practical for consumer use. Moreover, aside from cost, this apparatus is for use with SMPTE time code which is meant for professionals and may be difficult to operate by ordinary individuals.

In the second case, this apparatus outlined in U.S. Pat. No. 5,864,417 to Ko-Liang Ho, is limited in its ability to deflect the laser beam in circular patterns only. The patent also refers to earlier conventional technology which uses two sets of reflective mirrors, each connected to a rotary motor, and the U.S. Pat. No. 5,864,417 apparatus also requires springs to change the angle of inclination of the mirror to thereby change the projected patterns.

Reference is made to U.S. Pat. No. 4,887,197 to Effinger which departed in another direction and which is concerned with reflecting a laser beam so that it traverses a path on a display surface defining a visible display pattern responsive to an audio frequency input signal. The input signal is provided to a conventional speaker, and the laser beam is reflected from a front surface of a mirror, which mirror is mounted onto the speaker so that the mirror moves or vibrates in response to the input signal.

As noted, the U.S. Pat. No. 4,887,197 relies on laser deflection only of the vibration of a speaker to randomly deflect the laser beam.

In the apparatus of the U.S. Pat. No. 4,887,197, the mirror is connected directly to the speaker by means of a pedestal to provide a seesaw or teeterboard effect to the mirror, thereby restricting the freedom of movement of the mirror in two dimensions transversely to the diaphragm. This arrangement has a restriction on the control of the deflection of the laser beam.

The display patterns while responsive to audio frequencies in the U.S. Pat. No. 4,887,197 patent is only operable at low frequencies in the range of 20 to 200 Hertz.

SUMMARY OF THE INVENTION

In accordance with the teachings of this invention, problems in connection with the prior art are overcome, and for this purpose, the present invention broadly purposes the use of coils. More specifically, the mirror and coil laser beam projection apparatus in this present invention substantially enhances the ability to apply laser beam projection to consumer products over the designs of prior art.

This invention overcomes the problems of the prior art, and in particular the problems of U.S. Pat. No. 4,887,197. In these respects, the mirror and coil laser beam projection apparatus according to the teachings of the present invention substantially enhances the ability to apply laser beam projection to consumer products over the designs and structure of the prior art.

In view of the foregoing disadvantages inherent in the known types of laser projection apparatus present in the prior art, the present invention provides a new laser beam projection system wherein the laser beam can be projected using a more cost effective means and the resulting images are less restricted than that of the prior art.

As a result of the unique structure of the present invention, an expanded audio frequency range is usable, and the invention will operate with an audio frequency well above 200 Hertz. In accordance with a preferred embodiment of the invention, the most desirable result is achieved up to a frequency of 500 Hertz. Although satisfactory results are obtained in the entire audio range.

The general purpose of the present invention, which will be described subsequently in greater detail, is to provide a new laser beam projection system that has a number of advantages over the prior art and that is not anticipated, rendered obvious, suggested, or even implied by any of the prior art, either alone or in combination therewith.

To attain this, the present invention generally comprises a laser light source, a coil or series of coils and a mirror or series of mirrors. The light source can be any laser light source. The coil or coils are a voice-coil like component and the arrangement comprises a magnet and a wire coil which when an electrical current is applied to the wire coil, generates a magnetic field. The mirror or mirrors can be any mirror, however a front surface mirror is typically used for deflecting laser light. The mirror or mirrors are movable in response to the energization of the coils by the audio frequency of inputs.

There has thus been outlined, rather broadly, some of the more important features of the invention in order that the detailed description thereof may be better understood, and in order that the present contribution to the art may be better appreciated. There are additional features of the invention that will be described hereinafter.

In this respect, before explaining at least one embodiment of the invention which is presently the preferred embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide laser beam projection system that will overcome the shortcomings of prior art devices.

An object of the present invention is to provide a laser beam projection system that is a low cost system that can be used in consumer products.

Another object of the present invention is to provide a laser beam projection system that is not limited to circular beam deflection.

Another object of the present invention is to provide a laser beam projection system that uses a variable current input source to drive the laser beam deflection.

Another object of the present invention is to provide a laser beam projection system that uses multiple variable current input sources to drive the laser beam deflection.

Another object of the present invention is to provide a laser beam projection system that can be directly connected to any audio source as the electrical current input source for the deflection of the laser beam in coordination with the audio source.

Other objects and advantages of the present invention will become obvious to the reader, and it is intended that these objects and advantages are within the scope of the present invention.

To these ends, the present invention contemplates a display system for generating a visible pattern onto a display surface responsive to an audio frequency input signal, which includes means for emitting a visible beam of light along a predetermined beam axis, reflecting means interposed along the beam axis for reflecting the light beam to form a reflected beam directed generally toward the display surface, moving means including a pair of coils and a magnetizable means associated with each said coil responsive to audio frequency input signals for movement of the reflecting means to generate a pattern on the display surface, and mounting means for supporting said reflecting means proximate to said pair of coils for movement of the reflecting means relative to said moving means.

The reflecting means is movable in response to a sinusoidal input signal of an audio frequency to produce a pattern generated on the display surface which is substantially circular.

The invention also contemplates a laser beam projection apparatus broadly provided with means for generating a laser beam for impingement onto a reflecting surface of a mirror, and means responsive to a magnetic field associated with a pair of coils proximate to the mirror for movement of the mirror to change the direction of beams reflected from the mirror.

The apparatus is for use in combination with a light source and at least one audio signal for generating a visual display pattern responsive to the audio signal, in which the mirror is positioned for receiving a beam from the light source to form a reflected beam, a pair of coils and associated magnetic elements responsive to at least one of the audio signals, and means for coupling the coils and mirror for imparting angular movement to the mirror for movement of the mirror in two dimensions normal to an axis, thereby directing the reflected beam to traverse a course defining the visual display pattern responsive to the audio signal. As a further feature, the coupling means include spacing the mirror apart from the coils to permit movement of the mirror through an angular range in the two dimensions relative to the coils and thereby amplify the size of the display pattern and connecting one end of the mirror to maintain the mirror in a relationship to the coils for movement of the mirror relative to the coils.

The coils when responsive to an input signal consisting of a regular, periodic waveform having a frequency other than the resonant frequency, provides for the reflected beam to traverse a substantially elliptical path.

The invention also provides for a method of generating a visual display surface responsive to an audio frequency input signal comprising the steps of directing a light beam along a predetermined beam axis towards a reflecting surface of a mirror, providing a pair of coils and associated magnetic element responsive to the audio frequency input signal for energizing said coils with said audio signals, mounting the mirror and paid of coils relative to each other so that the mirror moves responsive to actuation of the coils with the input signal and causing the mirror to move to reflect the light beam in a different manner in accordance with the movement of the mirror to form a reflected beam directed generally towards the display surface to produce an image on the display surface, coupling the mirror with the coils so that the mirror moves responsive to audio signals input to the coils, and actuating the coils with the input audio signal so that the reflected beam traverses a path to produce an image on the display surface.

To the accomplishment of the above and related objects, this invention may be embodied in the form illustrated in the accompanying drawings, attention being called to the fact, however, that the drawings are illustrative only, and that various changes and modifications may be made in the specific construction illustrated without departing from the scope of the invention.

BRIEF DESCRIPTION OF THE DRAWINGS

In the Drawings

FIGS. 2A, 2B and 2C is the circuitry for use with the invention shown in schematic form of the electronic components used in the present invention;

DETAILED DESCRIPTION OF THE INVENTION

Figure 1:
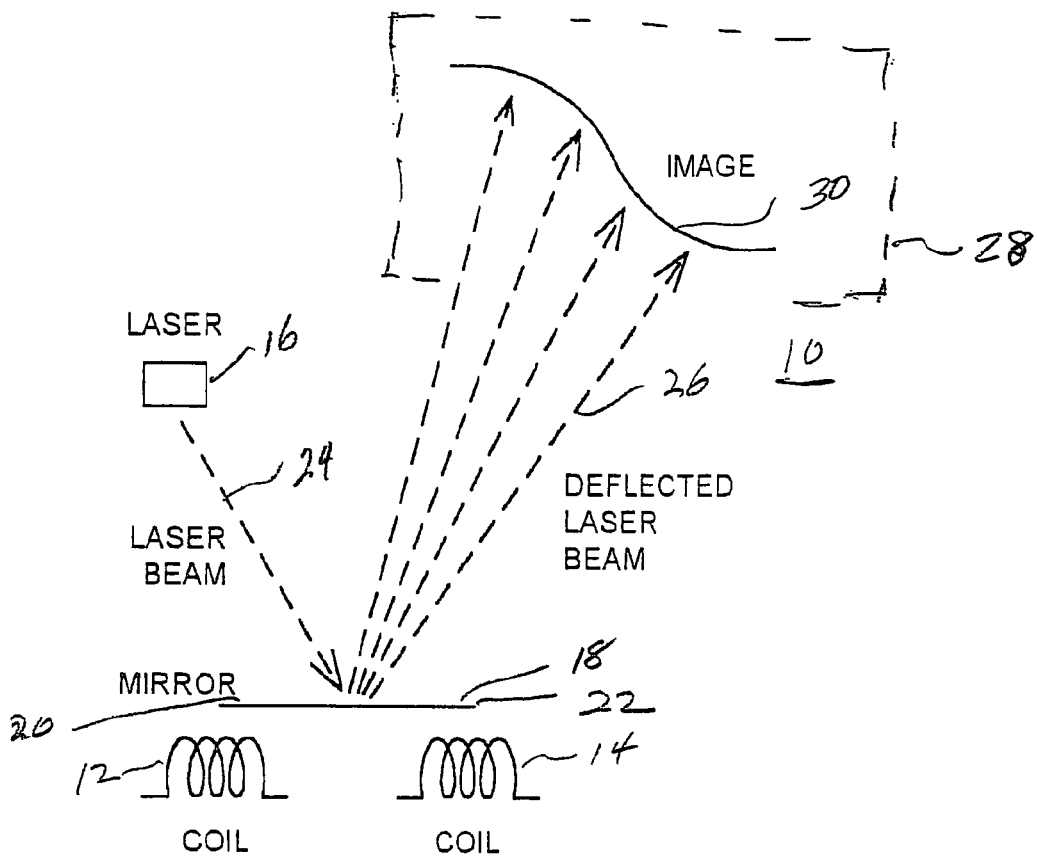
FIG. 1 is a schematic view of one embodiment of the present invention illustrating two coils with a mirror having its non-reflecting rear surface in front of the coils.

Referring now more particularly to the drawings, apparatus 10 is schematically shown and consists primarily of two (2) coils 12 and 14, a laser 16, a mirror 18, and an amplifier (not shown in this view). As seen in FIG. 1, the coils 12 and 14 are associated with the mirror 14 at opposite ends 20 and 22 of one of the mirrors and in this embodiment are positioned on the rear or back of the mirror which forms the non-reflecting side of the mirror. The coils can be attached directly to the mirror or indirectly and be connected to a support for the mirror proximate to the mirror. The coils 12 and 14 are attached to an amplifier (see FIGS. 2A, 2B and 3C) which is used to amplify the input current source to allow for use with various input sources, in particular an audio input source. In FIGS. 2A and 2B, the coils are shown as X for coil 12 and Y for coil 14. The schematic circuitry for the amplifier used is included and disclosed in FIGS. 2A, 2B and 2C; however, the amplifier is only necessary for certain applications and may or may not be present or necessary for all applications of the present art. It is disclosed and suggested for completeness.

In FIG. 1, the front face of mirror 18 is a light reflecting surface and the rear surface is a non-reflecting surface. Coil 12 is positioned proximate to edge 20 or connected thereto and coil 14 is positioned proximate to edge 22 or connected thereto for movement of mirror 18. When mirror 18 is supported on another member which also supports the coils 12 and 14, mirror 18 has movement imparted thereto responsive to the frequency of the audio input to the coils. Laser 16 emits a laser beam 24 which impinges onto the reflecting mirror face 18 and then forms a group of reflected rays 26 which impinges onto projection surface 28, schematically shown and forms an image 30 on the projection surface.

Figure 3A:
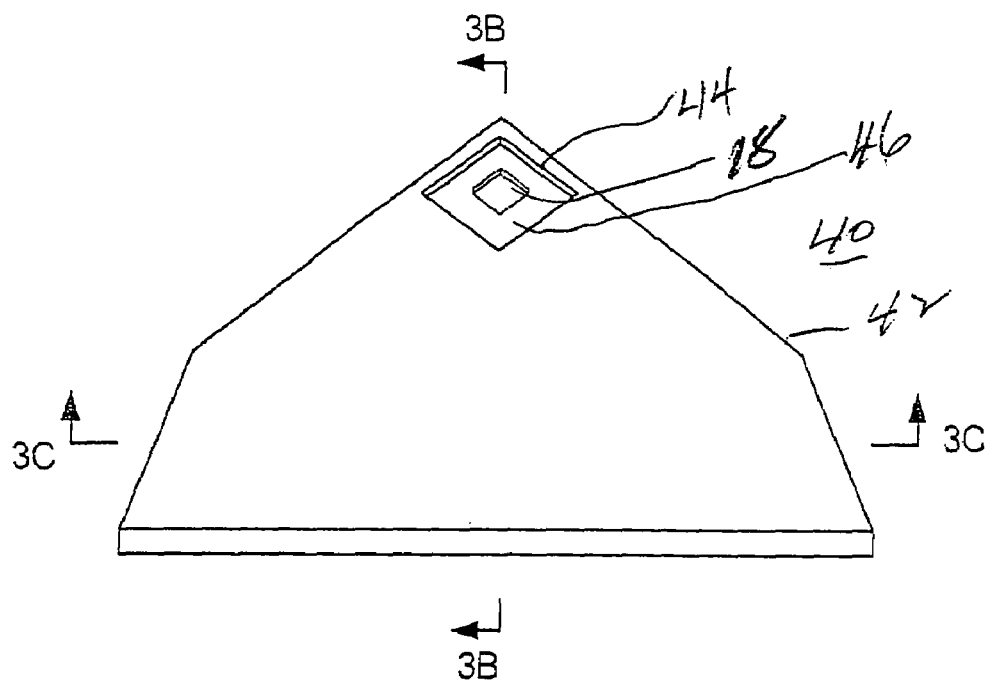
FIG. 3A is a dimensional diagrammatic overall configuration of a view of the enclosure in which the present invention is placed, and illustrates the exit window through which the laser beam is projected from the mirror contained within the enclosure.
Figure 3B:
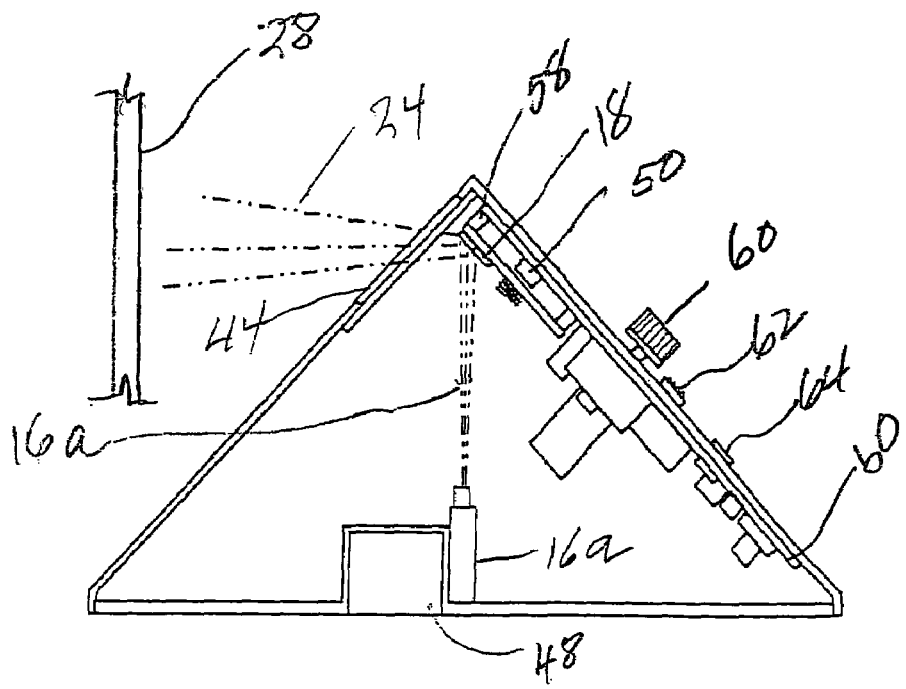
FIG. 3B is a section taken along line 3B—3B of FIG. 3A to illustrate the internal working parts and one arrangement of these parts relative to each other.
Figure 3C:
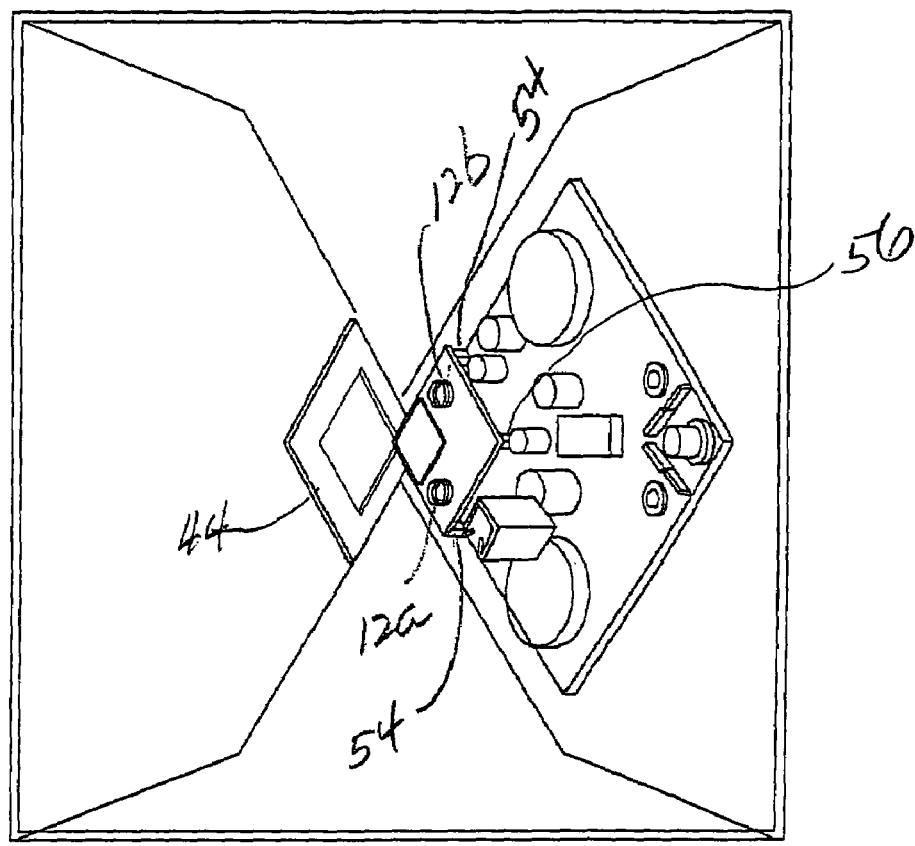
FIG. 3C is a sectional view taken along line 3C—3C of FIG. 3A to show another view of the internal working and detail parts and one arrangement of these parts relative to each other.
Figure 3D:
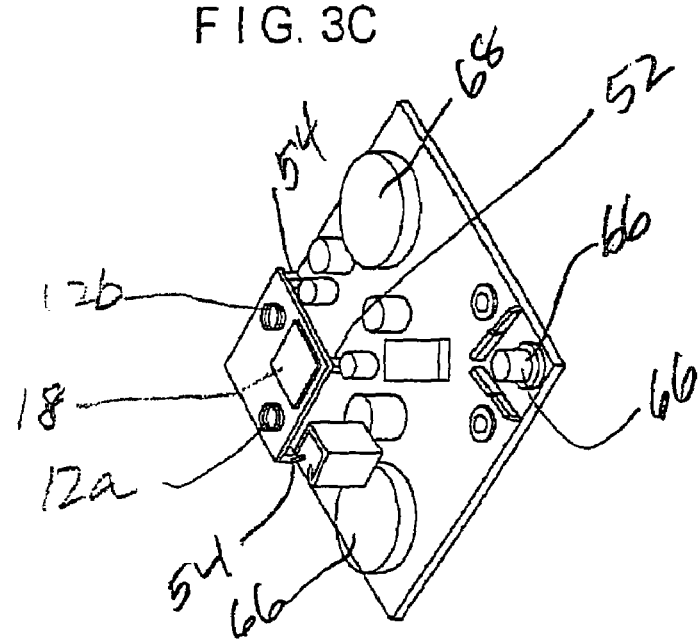
FIG. 3D is a detail view of a portion of the internal parts separated from the enclosure or housing and illustrating the same details as in FIG. 3C.

As noted heretofore, FIG. 1 schematically illustrates one embodiment of the invention, and in this schematic representation the coils are shown proximate to the rear or reverse side of the mirror. The coils can be connected to opposite ends of the mirror or associated with opposite ends of the mirror to impart movement to the mirror. As best seen in FIGS. 3B, 3C and 3D, the coils are shown as physically attached to a plate which supports the mirror 16 as will be explained subsequently. FIG. 1 is intended for simplicity of explanation of one embodiment and its operation.

Figure 1A:
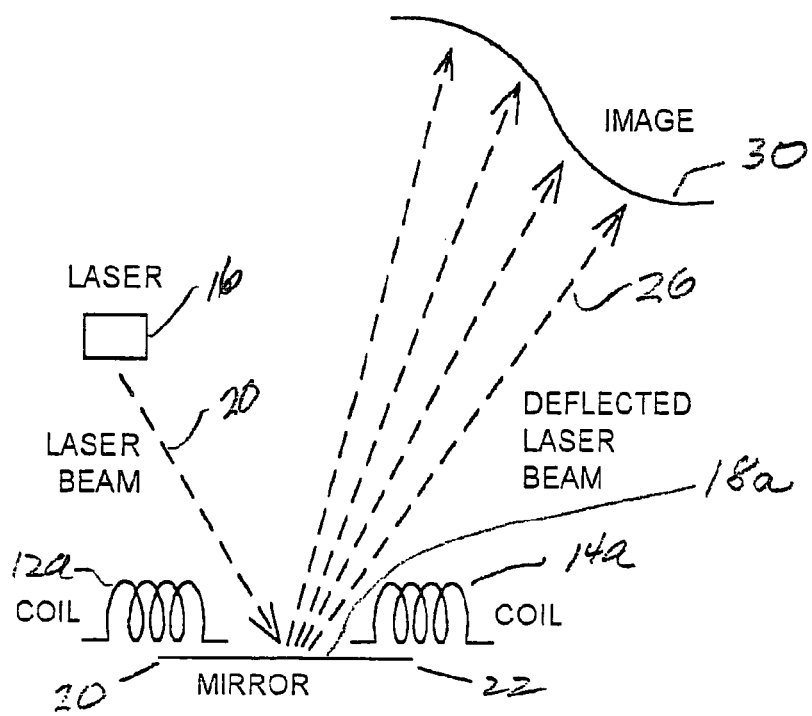
FIG. 1A is a schematic view of another embodiment of the present invention showing the two coils in front of the reflecting surface of the mirror.

FIG. 1A is a schematic representation of another embodiment of the invention in which like parts are designated with the same reference numeral and similar parts in a different position designated with a related numeral, and the coils 12a and 14a are shown schematically coupled to or associated or connected to opposite ends (of the mirror) with the front or obverse face 18a of the mirror. Throughout this specification as noted the same reference numerals will be used for the same parts, and where there is a modification or embodiment change, the numerals will be related. In a similar manner, the laser beam 24 is deflected by reflective mirror face 18a and forms the laser beam rays 26 which impinge onto the surface 28 to form the image 30. This representation is intended to illustrate different possibilities for positioning of the coils.

For purposes of explanation, laser beam 24 is directed towards the mirror. For best results the laser beam is directed along an axis to the mirror at a 45-degree angle and is deflected by the mirror at an angle depending on the position of the mirror towards projection surface 28, such as a wall, ceiling, floor or projection screen to produce an image thereon. When a variable input current source, such as an audio signal, is introduced into the coils, the magnetic properties of the coils change and cause the mirror to move towards and away from the laser beam. When this happens, since the mirror is connected to or associated with the coils, the movement of the coils causes the mirror to move relative to the laser beam. Due to the placement of the mirror between the coils, the movement of the mirror can be predicted. As one coil moves, the mirror is tilted in one direction, X. As the other coil moves, the mirror is tilted in the other direction, Y. As the two coils move, numerous different positions of the angle of deflection is obtained.

In accordance with the teachings of this invention, while the preferred angle of impingement of the laser beam onto the reflecting surface is desirably and preferred to be at an angle of 45 degrees, an angle of incidence between greater than zero (0°) degrees and less than ninety (90°) degrees will provide for the utility of this invention to provide the desired images 30 to be projected onto surface 28.

Whether the coils are placed onto or associated with the front surface reflecting surface of the mirror 18 or the rear surface will not change the operation of the invention; and as noted, the mirror can be carried by or supported by another member, and the coils can work with the other member to move the mirror. A more detailed explanation of the structure of an embodiment similar to FIG. 1A is set forth in the description of FIGS. 3A, 3B and 3C.

The result is a 2-dimensional movement of the mirror on an X-Y axis. With this movement the laser beam is deflected by the mirrored reflecting surface of the mirror 16 and projected onto the projection surface 28 at a rapid pace, faster than the eye can compute, therefore the result appears as laser light images drawn on the projection surface. Movement of the mirror changes the image 30 projected onto surface 28. One can control this image by controlling the audio input source. For example, if the same exact input is applied to both coils, then the mirror moves the same amount in the X and Y direction and the resulting image is a diagonal line. On the other hand, when a variable input is introduced or used, such as a sinusoidal input to the two coils, then the resulting image is a circle. As the variation between the inputs to the two coils increases, a variety of spirographic and lissajous images appear.

Applications for this apparatus are primarily for the entertainment of viewing the laser images. When the input source is an audio source such as music, the images appear to move responsive to the music creating a dynamic viewing experience.

Referring now more particularly to FIGS. 3A, 3B, and 3C and 3D which illustrate a preferred embodiment of a laser beam projection apparatus 40 constructed according to the teachings of this invention.

The laser beam apparatus 40 generally includes an outer housing 42 provided with an opening or window 44 through which the laser beam 24 is projected from reflecting mirror 18 which in this embodiment is supported on a plate 46 of insulating material which also carries coils 12a and 14a. Coils 12a and 14a are not shown in FIG. 3A, but are shown in FIGS. 3B, 3C and 3D for the sake of clarity. Nevertheless, they may or may not be shown in the window or opening 44. Outer housing 42 includes an enclosure 48 to house a portable power source such as a nine-volt battery and is provided with a conventional external power source in place of the battery.

As seen in FIG. 3C, a laser emitting device 16a is shown which emits a laser beam 24 for impingement onto mirror 18 to provide the reflecting rays from the reflecting face of mirror 18 which passes through window or opening 44 to impinge onto projection surface 28, shown in FIG. 3B as a portion of a conventional wall.

The coils 12a, 12b are shown in FIG. 3B as superimposed over each other with both the mirror 18 and the coils carried on the same side of the insulating plate 46.

Reference is made to FIGS. 3C and 3D, which show the coils 12a, 12b positioned on the same side of plate 46 as mirror 18. Plate 46 is positioned above a pair of magnetic elements 50, one for each coil 12a, 14a so that when the coils are energized they will cause the plate 46 to move towards and away from magnetic elements 50, and plate 46 is connected at one end 52 so that plate 46 is movable relative to the magnetic elements 50. To control the movement of plate 46, a pair of bumper or movement limiting elements 54 are provided; for additional control, a third bumper or movement limiting element 56 is provided, which is substantially the same as bumper or limiting element 54.

The one or single end 52 of plate 46 is provided with a flexible mover connector mechanism or means 58 such as a spring, or any other suitable flexible connector which will enable end 46 to have freedom of movement relative to magnetic elements 50 and yet maintain mirror 18 and plate 46 operatively associated with magnetic elements 50 so that upon energization of the coils 12a, 12b, plate 46 and mirror 18 are movable to change the patterns produced by the laser beam 24 on projection surface 28.

In order to adjust the image size, a pair of dials 60 is provided, one for each coil.

In order to supply the audio frequency to the amplifier, a pair of audio inlets 62 are provided, and as shown in FIG. 3B, one is superimposed over the other, and to provide for an external power source, an inlet connection 64.

A support 60 is provided to carry the various components and positioned inside enclosure 48. The external source which is connected through inlet connection 64 is connected with the internal element which can be either battery operated or externally operated.

While FIGS. 3A, 3B, 3C and 3D show the coils and mirror on the same side of insulating plate 46, the construction can also follow the schematic representation of FIG. 1.

The device as noted is operable with a nine-volt battery or with a regulated 12-volt DC power source input jack. Use of a regulated 12-volt 500 ma DC power supply is also an alternative.

The device can be connected to any stereo audio source such as home stereo, CD player, DVD player, MP3 player, or computer with the proper cables. The cables needed depend on the output jack(s) provided by the audio source.

The device 10 is controlled primarily by the audio input. It reacts best to lower tones in the frequency range of 40 Hz to 500 Hz. I have found that I obtain quite satisfactory results in an operating range below 500 Hz and above 20 Hz, and a preferred operating range is between above/about 200 Hz and below/about 500 Hz. This enables the mirror to move with the beat of most music sources. Higher tones are 1000 Hz or greater generally have little to no effect, so that musical pieces with very high tones will present little to no image display. This limitation enables the invention to reduce distortion, which is introduced when the laser is trying to react to too many frequencies at once.

The volume of the audio source will control the size of the images. To increase the size of the images the volume is increased and to decrease the size of the images the volume is decreased.

It is also possible to project the images at a farther point to generate larger images. The further away the projection surface 30 is, the larger the images will appear. When this distance is increased too far, the intensity of the images decreases. This is caused by the spreading of the concentrated laser light. The more spread out the images are the less bright they will appear. At present, it is preferred that the projection surface 30 be maintained between 10 and 25 feet from the mirror 78.

The two dials 60 on the backside are the gain control. These dials can be used to adjust the image size and shape. The dials represent the two audio input channels. It is possible to adjust one or both of these to obtain the desired image size and shape. The amount of adjustment necessary can be dependant on both the audio source as well as the music being played.

The two control knobs 60 are connected with internal controls or rhedstats 66 and 68 are provided for the adjustment of the size and the shape of the images.

While FIGS. 1 and 1A show the angle of incidence as at a 45-degree angle, the invention also contemplates that the laser stream can be directed towards the mirror at an angle, which varies between an amount less than 45 degrees from the angle of incidence shown in and greater than 45-degrees. Accordingly, the angle of impingement should be at an angle somewhat greater than zero degrees, and less than 90 degrees.

It will be obvious to those skilled in the art that various changes and modifications may be made without department from the scope of the invention.

The invention claimed is:

1. A display system for generating a visible pattern on a display surface responsive to an audio frequency input signal, comprising:
    means for generating a laser beam to provide a visible beam of light along a predetermined beam axis;
    reflecting means interposed along the beam axis for reflecting the light beam to form a reflected beam directed generally toward the display surface;
    moving means including a pair of coils and an individually magnetizable means associated with each said coil responsive to audio frequency input signals for movement of the reflecting means to generate a pattern on the display surface; and
    mounting means for supporting said reflecting means proximate to said pair of coils for movement of the reflecting means relative to said moving means.

2. The display system according to claim 1 wherein said reflecting means is movable in response to a sinusoidal input signal of an audio frequency to produce a pattern generated on the display surface which is substantially circular.

3. The display system according to claim 1, wherein the audio frequency input signal has an audio range which is above about 200 Hz and below about 500 Hz.

4. The display system of claim 1 wherein the predetermined beam axis has an angle of variation of the visible beam of light which is greater than zero degrees and less than ninety-degrees.

5. The display system of claim 1 wherein the coils are positioned on the same side as the mirror.

6. The display system of claim 1 wherein the coils are positioned on the reverse-side of the mirror.

7. The display system according to claim 1 including means acoustically coupling said moving means to the output of an audio frequency source.

8. The display system according to claim 1, including connection means associated with said coils for connection to the audio frequency input signal to transmit the audio input signal to said coils.

9. A laser beam projection apparatus for use in combination with a light source and at least one audio signed for generating a visual display pattern responsive to the audio signal comprising:

means for generating a laser beam for impingement onto a reflecting surface of a mirror;

said mirror being positioned for receiving a beam from the light source to form a reflected beam;

a pair of coils and individual means associated with each said coil responsive to a magnetic field, said pair of coils being proximate to said mirror for movement of the mirror to change the direction of beams reflected from the mirror;

said pair of coils and said associated magnetic fields being responsive to one of the at least one audio signal of said at least one audio signal; and including means for coupling said coils and said mirror for imparting angular movement to the mirror for movement of the mirror in two dimensions normal to an axis, thereby directing the reflected beam to traverse a course defining the visual display pattern responsive to the audio signal.

10. The laser beam projection apparatus as claimed in claim 9 wherein at least one of said mirrors is movable in response to the magnetic field.

11. The apparatus of claim 9, wherein the coupling means comprises spacing the mirror apart from the coils to permit movement of the mirror through an angular range in said two dimensions relative to the coils and thereby amplifying the size of the display pattern and including means connecting one end of the mirror to maintain the mirror in a relationship to the coils for movement of the mirror relative to the coils.

12. The apparatus of claim 9 in which the angular range is greater than zero-degrees and less than ninety-degrees.

13. The apparatus of claim 9 wherein the mirror and the coils are positioned on a support plate mounted proximate to and spaced from said magnetic elements.

14. The apparatus of claim 9 wherein the coils when responsive to an input signal consisting of a regular, periodic waveform have a frequency other than the resonant frequency, and the reflected beam traverses a substantially elliptical path.

15. The apparatus of claim 9 wherein the pair of coils is connected with opposite edges of the mirror.

16. The laser beam projector as claimed in claim 14 including at least one coil of said pair of coils being associated with one end of said mirror for generating a magnetic field and at least another coil of said pair of coils being associated with another end of said mirror to impart movement to said mirror responsive to audio inputs to said coils, such that the laser beam is deflected by movement of said mirror in response to the magnetic field generated by said coils.

17. A method of generating a visual display surface responsive to an audio frequency input signal comprising the steps of:

directing a laser light beam along a predetermined beam axis towards a reflecting surface of a mirror;

providing a pair of coils and an associated magnetic element for each said coil responsive to the audio frequency input signal for energizing said coils with said audio signals;

mounting the mirror and said pair of coils relative to each other so that the mirror moves responsive to actuation of the coils with the input signal and causing the mirror to move to reflect the laser light beam in a different manner in accordance with the movement of the mirror to form a reflected beam directed generally towards the display surface to produce an image on the display surface;

coupling the mirror with the coils so that the mirror moves responsive to audio signals input to said coils; and actuating the coils with the input audio signal so that the reflected beam traverses a path to produce an image on the display surface.

18. The method according to claim 17 wherein the coils are mounted on the rear non-reflecting surface of the mirror.

19. The method according to claim 17, wherein the coils are positioned on the same side as the reflecting surface of the mirror.

* * * * *